United States Patent Office 3,635,865
Patented Jan. 18, 1972

3,635,865
PLASTICIZED TERMINALLY ACTIVE LIQUID DI-OLEFIN POLYMERS CONTAINING POLYALKYL-ENIMINES
Douglas C. Edwards and Premysl Thomas Dolezal, Sarnia, Ontario, Canada, assignors to Polymer Corporation Limited, Sarnia, Ontario, Canada
No Drawing. Filed Dec. 11, 1969, Ser. No. 884,366
Claims priority, application Canada, Feb. 10, 1969, 42,428
Int. Cl. C08d 11/02
U.S. Cl. 260—28.5    9 Claims

ABSTRACT OF THE DISCLOSURE

The retardation of the rate of vulcanization of highly extended compositions of liquid polymers of conjugated diolefins having terminal allylic halide groups has been found to be lessened or even overcome by the use of a poly(alkylenimine) containing more than five amine groups and having a molecular weight of at least about 250.

---

This invention relates to vulcanizable compositions of halogen containing polymers of olefinically unsaturated compounds. In particular, it relates to the process of vulcanizing plastic compositions of amine-vulcanizable polymers of conjugated diolefins and to sealants and molding compositions produced therefrom.

Rubbery vulcanizates of liquid polymers of conjugated diolefins having more than one terminal allylic halide group are described in application Ser. No. 559,733, now U.S. Pat. 3,506,742. The patent discloses that multifunctional amines may be used as the vulcanization agents but the highest polyamine mentioned therein is tetraethylene pentamine. It also discloses that liquid polymers can be mixed with plasticizers such as waxes, oils, asphaltic and bituminous materials. The presence of these plasticizers generally retards the rate of vulcanization to the extent that, for some applications requiring a rapid room temperature cure, the use of high plasticizer loadings is rendered impractical.

It has now been found, surprisingly, that fast room temperature cures can be obtained, even in highly extended compositions, by the use of a poly(alkylenimine) containing more than five amine groups and having a molecular weight of at least about 250.

In accordance with this invention, a vulcanizable plastic or pourable composition is provided which comprises a mixture of (1) a polymer of an olefinically unsaturated compound, said polymer containing polymeric molecules with more than one active halogen atom, (2) a poly (alkylenimine) having a molecular weight of at least about 250 and more than five amine groups per molecule, and (3) about 20 to 400 parts per 100 parts of polymer of a compatible plasticizer for said polymer.

This mixture is workable at room temperature for a period of less than 24 hours, preferably not more than 8 hours, and may be cured at room temperature to produce a substantially insoluble rubbery resilient composition. Depending on the amount and type of plasticizer used, the compositions are suitable for use as inexpensive sealants and as molding compositions.

The term "polymer" used in this specification is understood to include any non-volatile material obtained by the addition polymerization of olefinically unsaturated compound or compounds. Oligomers and polymers having a molecular weight of 1000 or less are not included in this term. Above this lower limit, the molecular weight may vary widely, although it is desirable for many purposes that the polymer be liquid and pourable, preferably at room temperature, that is, that it has a bulk viscosity of less than 10,000, preferably not more than 5,000, poise at 25° C.

The polymer of an olefinically unsaturated compound which can be used in this invention has more than one active halogen per molecule in the majority of the molecules. The reactive halogen is a halogen which is capable of reacting at room temperature with aliphatic amines to form an ionic bond; it preferably is an allylic halogen. The halogen atom may be selected from chlorine, bromine, or iodine, although best results are obtained with polymers having allylic bromide groups. It is preferred that the allylic halide groups are attached to the polymeric molecules in terminal positions, i.e. at the ends of linear chain molecules and, if the molecules are branched, at the end of branches. In other words, the preferred polymer contains molecules with two or more terminal allylic halide groups.

The polymer may be prepared by a free radical polymerization of olefinically unsaturated compounds such as described in application Ser. No. 559,733, now U.S. Pat. 3,506,742. It may be a homopolymer or a copolymer of two or more polymerizable compounds. Unsaturated hydrocarbons are the preferred compounds, although a small proportion of the polymerizable compounds may contain oxygen, nitrogen and/or chlorine atoms. The preferred liquid polymers used in this invention are polymers of diolefinic hydrocarbons containing 4 to 8 carbon atoms such as butadiene-1,3, isoprene, pentadiene-1,3, 2,3-dimethyl-pentadiene, and best results are obtained with polymers of butadiene-1,3 with or without a minor amount of copolymerized vinyl compounds such as styrene, acrylonitrile, alkyl acrylate and others. Depending on the molecular weight of the liquid polymer, number of the allylic halide groups and type of the halogen atom, the halogen content of the liquid polymer falls within the range of 1–20 weight percent and preferably within the range of 1.5–15 weight percent.

It is also possible to produce such polymers by post-polymerization modification of polymers under conditions such that at least two active halogens, preferably allylic halogens, are produced in a polymeric molecule. Examples of such modification processes are halogenation of terminally hydroxylated polymers, oxidative halogenation of saturated liquid polymers or degradative halogenation of said polymers.

The poly(alkylenimine) used in this invention is a material having an average molecular weight of at least 250 and preferably about 300 to 50,000 and containing an average of more than five amine groups per molecule, preferably 7 to above 1000 amine groups. The preferable material is a liquid product of the polymerization of an alkylenimine. Representative examples of the alkylenimine are ethylenimine, methyl, ethyl and generally an alkyl or aryl substituted ethylenimine of the general formula

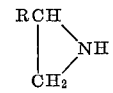

where R is hydrogen, $C_1$–$C_6$ alkyl or an aryl radical. Ethylenimine polymer is preferred; it is believed to be a branched polymeric chain consisting of carbon and nitrogen atoms having branches attached to nitrogen atoms. About half of the nitrogen atoms of the polymer are nitrogens of secondary amine groups, the remainder is divided between primary and tertiary amine nitrogens. The poly(alkylenimine) is a very effective vulcanizing agent for the halogen containing polymers of this invention and in the absence of plasticizers produces a tightly cross-linked vulcanizate having a rather low elongation. In cases where a reduction in cure rate is necessary, it may be desirable to mix the poly(alkylenimine) with water. The relative amount of water may vary from about 10% to about 300% based on poly(alkylenimine).

The amount of poly(alkylenimine) may be varied within wide limits depending on the type of vulcanizate required, the type and molecular weight of the polymer used and the type and amount of plasticizer in the compound. When it is desired to form a rubbery resilient vulcanizate, the poly(alkylenimine) is used in a minor amount relative to halogen containing polymer. As little as 0.5 part can be used, but it is preferred to use at least about 1 part by weight per 100 parts of polymer. The upper limit for rubbery vulcanizate is less than 100 parts, preferably about 50 parts by weight per 100 parts of polymer. In the case of liquid polymer of butadiene having two terminal allylic bromide groups, best results are obtained with about 5 to 25 parts by weight of poly(ethylenimine).

The third essential component of this invention is a plasticizer. It is used in amounts between about 20 and 400 parts by weight per 100 parts of the halogen containing polymer. The preferred limits are about 40–300 parts. Any conventional rubber plasticizer can be used provided it is compatible with the polymer. In the case of polymers of butadiene which are free of polar groups other than halogen containing groups, hydrocarbon and halogen substituted hydrocarbon plasticizers are preferred. However, other plasticizers, e.g. of the ester type, can also be advantageously used. Similarly, in the case of polar polymers containing nitrile, ester and ether groups, ester type plasticizers are preferred, although the predominantly hydrocarbon plasticizers are also useful. Representative examples of plasticizers which can be used are petroleum oils such as are produced in catalytic cracking and dehydrogenation reactions, oils from alkylation reactions, oligomers and low polymers of lower olefins, coal tar products, bituminous and asphaltic oils, vegetable oils, waxes, synthetic esters of higher $C_4$–$C_{18}$ alcohols and mono or dibasic acids such as dibutyl maleate, butyl oleate, butyl stearate, dibutyl phthalate, dioctyl adipate, didecyl phthalate.

Other compounding materials can be used if desired. For example, various fillers, white or black, reinforcing or non-reinforcing, may be mixed with the plastic or pourable composition of this invention in amounts of up to 400 parts by weight per 100 parts of polymer either to reduce the cost without unduly affecting the properties of composition or to increase the strength of the vulcanizate. Representative examples of such fillers are carbon blacks, silica, titania, clays, barytes, asbestos, magnesium carbonate, diatomaceous earths, limestone, mica, pumice, talc and cellulose.

Highpolymeric materials which are non-reactive with poly(alkylenimine) such as polyethylene, polypropylene, ethylene-propylene copolymers and terpolymers, polybutadiene and polyisoprene may be added if it is desired to modify the viscosity characteristics of the uncured composition or the properties of the vulcanized rubber.

The compositions of this invention are suitable for use as sealants for the automotive and building industry or as molding materials. As sealants, they can be conveniently applied in a plastic state to the materials or articles to be sealed and then cured in situ either at ambient temperature of about 15° C. or at elevated temperature of up to 200° C. The method of the application will depend on the rheological properties of the plastic composition as well as the peculiarities and physical shape and dimensions of the surface to be sealed; it may be poured, applied with a knife or a spreader or gunned from a pressure gun.

Because of a high plasticity and fast curing, even at low temperatures, to a resilient rubber, plastic compositions of this invention are also suitable for use as a molding materials where an accurate reproduction of a complicated shape is desired. The resilience and strength of the vulcanizate permits a safe removal of the mold without the danger of breaking or distorting it. For these reasons, the composition of this invention is particularly suitable for making dental impressions.

The following examples will further illustrate the invention.

EXAMPLE I

A liquid polybutadiene having a Brookfield viscosity of 1250 poise at 25° C. and a bromine content of 12% by weight, half of which was allylic bromine, was mixed with coal tar (Road Tar Grade 45) and poly(ethylenimine). Three samples of poly(ethylenimine) having a molecular weight ranging from 600 to 1800 were used in amounts as indicated in Table I. The ratio of polybutadiene to coal tar was 30 to 70 by weight. The mixtures were cured at room temperature for two days and tested for percent set which was taken as a measure of the degree of curing. The test was performed on a 6 mm. x 60 mm. strip specimen about 2 mm. thick; it was stretched to 100% strain, held strained for 30 seconds, then relaxed for 30 seconds on a talc covered surface after which time percent set i.e.

$$\frac{\Delta L}{L} \times 100$$

was measured. The cure time was estimated by manual handling of the specimen at various time intervals. When it was dry to the touch and could be reversibly stretched to about 100% strain, it was judged to have developed rubbery properties and be cured. The results are presented in Table I.

Two control compositions were prepared and tested using the same procedures as described above: Control A was made with methylated triethylene tetramine instead of poly(ethylenimine) and Control B with methylated pentaethylene hexamine.

TABLE I

| Composition | Vulcanizing agent [1] | Amount (pts./100 pts. polymer plus coal tar) | Cure time (minutes at r.t.) | Percent set after 2 days curing |
|---|---|---|---|---|
| 1 | PEI 6 | 1.5 | 145 | 3. |
| 2 | PEI 6 | 3.0 | 50 | 1. |
| 3 | PEI 6 | 6.0 | 40 | 0. |
| 4 | PEI 12 | 1.5 | 155 | 1. |
| 5 | PEI 12 | 3.0 | 65 | 3. |
| 6 | PEI 12 | 6.0 | 40 | 0. |
| 7 | PEI 18 | 1.5 | 270 | Undercured. |
| 8 | PEI 18 | 3.0 | 65 | 1. |
| 9 | PEI 18 | 6.0 | 35 | 2. |
| Control: | | | | |
| A | MTETA | | ([2]) | Not cured. |
| B | MPEHA | | ([2]) | Do. |

[1] PEI 6 stands for poly(ethylenimine) having a molecular weight of 600 and an average of 14 amine nitrogens; PEI 12 stands for poly(ethylenimine) having a molecular weight of 1200 and an average of 28 amine nitrogens; PEI 18 stands for poly(ethylenimine) having a molecular weight of 1800 and an average of 42 amine nitrogens; MTETA stands for fully N-methylated triethylene tetramine; MPEHA stands for fully N-methylated pentaethylene hexamine.
[2] More than 2 days.

The above data show that the polybutadiene having allylic bromide groups was cured at room temperature in the presence of coal tar to a rubber elastic vulcanizate within a time between ½ to about 4 hours. When the poly(ethylenimine) was replaced with methylated triethylene tetramine or methylated pentaethylene hexamine, the vulcanization was very slow and Controls A and B were tacky and not cured after two days at room temperature.

An additional composition was made by mixing 100 parts of the polybutadiene, described above, with 150 parts of an asphalt (MC–2 grade) and curing at room temperature with 7.5 parts of poly(ethylenimine) having a molecular weight of 600. After 3 hours, the composition was cured and showed high extensibility and full retraction after stretching.

EXAMPLE II

A sealant masterbatch was prepared by mixing the following ingredients:

| | Parts by weight |
|---|---|
| Polybutadiene of Example I | 100 |
| High abrasion furnace blank | 15 |
| Basic lead carbonate | 5 |
| Naphthenic oil (Saybolt universal viscosity of 220 sec.) | 130 |
| Calcium carbonate filler | 180 |
| Low density polyethylene | 20 |
| Nickel dibutyl dithiocarbamate (antiozonant) | 1.5 |

The polyethylene was first dissolved in the oil by heating to 150° C. and then added to the other components. Six portions of the masterbatch were then mixed with various amounts of poly(ethylenimine) having the molecular weight of 600 and press cured at different temperatures and times as indicated in Table II. The cured specimens were tested for stress-strain using an Instron tester and the results are shown in Table II.

TABLE II

| Sealant number | 1 | 2 | 3 | 4 | 5 | 6 |
|---|---|---|---|---|---|---|
| PEI 6 (parts/100 parts polybutadiene) | 5 | 10 | 20 | 5 | 5 | 7.5 |
| Vulcanization temp. (° C.) | 100 | 100 | 100 | 100 | 100 | 25 |
| Vulcanization time (min.) | 20 | 20 | 20 | 5 | 80 | (a) |
| Tensile strength (kg./cm.$^2$) | 11 | 16 | 13 | 11 | 15 | 13 |
| Elongation (percent) | 250 | 310 | 320 | 290 | 250 | 380 |
| 100% modulus (kg./cm.$^2$) | 7 | 8 | 6 | 6 | 8 | 6 | a Three days.

The above data show that the composition plasticized with the naphthenic oil was cured with poly(ethylenimine) within 5 minutes at 100° C. and formed a rubber elastic composition of satisfactory strength. Sealants 1, 2 and 3 show that the cure is not sensitive to the loading of poly(ethylenimine) in the range from 5 to 20 parts/100 parts of polybutadiene. Sealant 5 cured for 80 minutes shows increased tensile strength and modulus and a lower elongation when compared to Sealant 4 cured for only 5 minutes; there is no reversion in vulcanizate properties as the curing time is extended. Sealant 6 shows that satisfactory vulcanizate properties are obtained also in room temperature curing.

EXAMPLE III

Three portions of the masterbatch of Example II were mixed with 7.5 parts by weight per 100 parts of polymer of PEI 6 containing different amounts of water as shown in Table III. The mixtures were tested for pot life, that is, the time they remain workable before curing sets in.

TABLE III

| Sealant | 7 | 8 | 9 |
|---|---|---|---|
| Water/PEI 6 (pts./pts. by wt.) | 0/100 | 10/90 | 20/80 |
| Pot life (minutes) at: | | | |
| 18° C | 33 | 50 | 55 |
| 35° C | 21 | 23 | 25 |
| 43° C | 13 | 16 | 19 |

Sealant 9, having a pot life about 50% longer than the dry sealant, Sealant 7, was cured at 100° C. and tested for stress-strain properties. The results are shown in Table IV.

TABLE IV

| Sealant | 9A | 9B | 9C |
|---|---|---|---|
| Vulcanization time (min.) | 5 | 20 | 80 |
| Tensile strength (kg./cm.$^2$) | 14 | 17 | 12 |
| Elongation (percent) | 300 | 300 | 210 |
| 100% modulus (kg./cm.$^2$) | 6 | 7 | 8 |
| Shore A-2 hardness | 20 | 29 | 36 |

The presence of water in poly(ethylenimine) apparently had no detrimental effect on the properties of vulcanized sealant composition.

Similar results were obtained with a masterbatch in which carbon black, basic lead carbonate, polyethylene and antiozonant were omitted.

EXAMPLE IV

A molding composition for taking dental impressions was prepared by mixing separately in a paint mill the following compositions:

Composition A (in parts by weight):
  100 polybutadiene of Example I
  50 polychlorinated polyphenyl (sp. grav. 1.404–1.414) at 15.5° C., Saybolt viscosity 73–80 sec. at 54° C.
  75 precipitated calcium carbonate (average particle size 0.05 micron)
  2 titanium dioxide (average particle size 0.3 micron)
and Composition B:
  20 poly(ethylenimine) M.W. 1200
  30 precipitated calcium carbonate (particle size 0.05 micron)
  1 peppermint oil
  ½ red dye 0.5% solution in toluene Compositions A and B were mixed in a ratio of 5:1 by weight and the combination allowed to thicken for about 5 minutes. Following this 5 minute interval, the thickened composition was formed into a U-shape and pressed against the teeth in an upper jaw and left in place for 4 minutes. After this time, the composition had cured sufficiently to be removed without distorting the fine dental impressions of the mold. The cured composition was rubbery, resilient and repeatedly sprang back into shape upon the removal of distorting forces to which it was subjected.

What is claimed is:

1. An improved vulcanizable composition comprising a mixture of (1) a polymer of a conjugated diolefin containing 4–8 carbon atoms, said polymer containing polymeric molecules with more than one allylic bromide group, (2) from 0.5 to less than 100 parts of a poly(alkylenimine) having a molecular weight of about 300 to 50,000 and about 7 to about 1,000 amine groups per molecule, and (3) about 40–300 parts of a compatible plasticizer for said polymer, said parts being parts by weight per 100 parts of polymer, said composition being capable of vulcanizing at room temperature within a time of up to about 4 hours.

2. The composition according to claim 1 in which the polymer is a polymer of butadiene-1,3 having an average of about two terminal allylic bromide groups per molecule.

3. The composition according to claim 1 in which the polymer is a liquid polymer having a bulk viscosity of not more than about 10,000 poise at 25° C.

4. The composition according to claim 1 in which the poly(alkylenimine) is poly(ethylenimine).

5. The composition according to claim 1 in which the plasticizer is chlorinated polyphenyl.

6. The composition according to claim 1 in which the plasticizer is a naphthenic oil.

7. The composition according to claim 1 in which the plasticizer is coal tar.

8. The composition according to claim 1 in which the compatible plasticizer is selected from the group consisting of hydrocarbon oils, halogenated hydrocarbons, bitumen, asphalt and coal tar and is present in an amount from about 50 to about 250 parts by weight per 100 parts of polymer.

9. A process of producing a rubbery composition which comprises mixing (1) a polymer of a conjugated diolefin containing 4–8 carbon atoms, said polymer containing polymeric molecules with more than one allylic bromide group, (2) from 0.5 to less than 100 parts of a poly(alkylenimine) having a molecular weight of about 300 to 50,000 and about 7 to about 1,000 amine groups per molecule, and (3) about 40–300 parts of a compatible plasticizer for said polymer selected from the group consisting of hydrocarbon oils, halogenated hydrocarbons, bitumen, asphalt and coal tar, said parts being parts by weight per 100 parts of polymer, and curing said mixture at a temperature between room temperature and 200° C. to produce a substantially insoluble rubbery composition.

No reference cited.

MORRIS LIEBMAN, Primary Examiner

P. R. MICHL, Assistant Examiner

U.S. Cl.X.R.

260—2 EN, 28.5 B, 33.6 AQ, 33.8 UA